(12) United States Patent
Johnson

(10) Patent No.: US 6,466,773 B1
(45) Date of Patent: Oct. 15, 2002

(54) REFLECTIVE POWER SPLITTER FOR REDUNDANT RECEIVERS

(75) Inventor: Kent K. Johnson, S. Lake Tahoe, CA (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 08/856,752

(22) Filed: May 15, 1997

(51) Int. Cl.[7] ................................................. H04B 1/18
(52) U.S. Cl. ........................ 455/132; 455/280; 455/303
(58) Field of Search .................................. 370/275, 297, 370/339, 272, 273, 315; 333/1.1; 330/295, 124 R, 148; 455/82, 83, 84, 78, 303, 338, 296, 280, 311, 132, 13.3

(56) References Cited

U.S. PATENT DOCUMENTS

| | | | | |
|---|---|---|---|---|
| 4,056,785 A | * | 11/1977 | Swan | 330/53 |
| 4,161,694 A | * | 7/1979 | Weber et al. | 370/315 |
| 4,206,464 A | * | 6/1980 | Hirsch | 333/1.1 |
| 4,688,259 A | * | 8/1987 | Edridge | 455/13.3 |
| 4,725,842 A | * | 2/1988 | Mayberry | 342/198 |
| 4,791,421 A | * | 12/1988 | Morse et al. | 342/368 |
| 5,027,125 A | * | 6/1991 | Tang | 342/368 |
| 5,446,464 A | * | 8/1995 | Fedle | 342/175 |
| 5,760,645 A | * | 6/1998 | Comte et al. | 455/333 |

FOREIGN PATENT DOCUMENTS

GB 2 307 829 A * 6/1997 ............. H04B/1/48

* cited by examiner

Primary Examiner—William Trost
Assistant Examiner—Philip J. Sobutka
(74) Attorney, Agent, or Firm—Duane Morris LLP

(57) ABSTRACT

A device and method for splitting received signal energy among plural receivers in which received signal energy is provided to a first receiver which uses a primary portion of the received signal energy and reflects a reflected portion of the received signal energy, and in which the reflected portion is directed to an additional receiver(s) for use. Low loss directional circulators Or couplers may be used to direct the signal. The loss of signal energy to the first and subsequent receiver(s) is significantly reduced.

5 Claims, 2 Drawing Sheets

REFLECTIVE POWER SPLITTER FOR REDUNDANT RECEIVERS

BACKGROUND OF THE INVENTION

The present invention is directed to radio receivers, and more particularly to a method and device for splitting received radio signals among plural receivers.

A radio system may operate with redundant receivers to increase operational reliability of the system. Often it is beneficial to provide the same signal to several receivers. Typically a primary (or first) receiver and one or more standby (or second) receivers use the same antenna and the received signal is provided to all of the receivers through a splitter or switch. Splitters are generally preferred because switches require time to switch the signal path and are generally less reliable and more expensive.

With reference now to FIG. 1, a conventional radio system with a primary receiver 10 and secondary receiver 12 typically uses a power splitter 14 to direct a portion of a signal received at antenna 16 to secondary receiver 12. However, the splitter and the redirection of the received signal cause power losses which degrade system performance and are desirably avoided. Losses in one path may be reduced by intentionally splitting the signal unequally so that a primary receiver(s) performance is degraded less than that of a secondary receiver(s). If the signal is split 50—50 between the primary and secondary receivers, the splitter loss for each receiver (denoted often the noise figure) would be 3 dB, and if the split were 90–10 the primary receiver noise figure would be 0.5 dB and the secondary receiver noise figure would be 10 dB. The use of high quality factor splitters which do not waste signal energy may further reduce losses.

In the prior art the signal is typically provided to a low noise amplifier in the receiver. A characteristic of low noise amplifiers is that they exhibit poor impedance matches when they are optimized for a low noise figure. The prior art inserts isolators or directional couplers before the low noise amplifier to minimize the undesirable effects of the poor impedance matches. However, these components introduce further losses which degrade system performance.

Accordingly, it is an object of the present invention to provide a novel method and device which splits a received signal while avoiding most of the losses of the prior art, thereby obviating the problems of the prior art.

It is another object of the present invention to provide a novel method and low noise figure power splitter for redundant receivers which eliminates most of the loss prior to the low noise amplifier in which the entire received signal is directed to a low noise amplifier in the primary receiver which is intentionally optimized for low noise (thereby aggravating the impedance mismatch) to cause a usable signal to be reflected, and in which the reflected signal is routed to the remaining receivers for use.

It is yet another object of the present invention to provide a novel method and device in which the normally undesirable mismatch of the noise optimized amplifier in the primary receiver is used to cause a reflection of power to standby receivers.

It is still another object of the present invention to provide a novel method of splitting received signal energy among plural receivers in which received signal energy is provided to a directional circulator (or coupler) which is coupled to a first receiver which reflects a reflected portion of the received signal energy, and in which the reflected portion is directed by the directional circulator (or coupler) to a second receiver for use.

It is a further object of the present invention to provide a novel device for providing a received signal to primary and standby receivers in which a first circulator (or coupler) is coupled to the primary receiver for directing a received signal thereto, the primary receiver having a low noise amplifier having a low return loss so that usable signals are reflected from its input, and in which a second circulator (or coupler) is coupled to the first circulator (or coupler) and to a standby receiver for directing the signal reflected from the low noise amplifier to the standby receiver.

It is yet a further object of the present invention to provide a novel method of splitting received signal energy between a primary and a standby receiver so that when the primary receiver is inoperable otherwise removed, signal energy to the standby receiver is increased.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
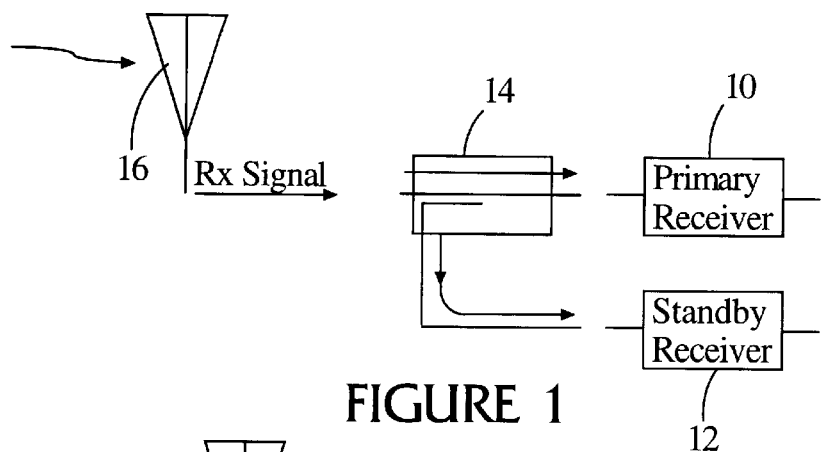
FIG. 1 is a partial schematic diagram of a signal receiver system.
Figure 2:
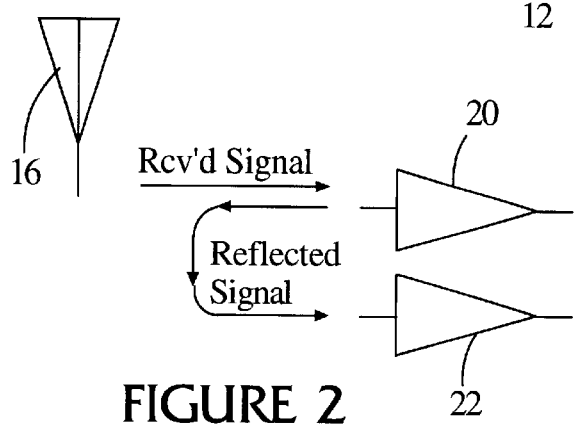
FIG. 2 is a partial schematic diagram of signal receiver system illustrating operation of the present invention.

With reference now to FIG. 2, in an embodiment of the present invention in which received signal energy is divided among plural receivers (represented in FIG. 2 by amplifiers 20 and 22 as the remainder of the receiver is not significant to the present invention), the received signal energy is provided in its entirety to a first amplifier 20 in a first receiver which amplifies a primary portion of the received signal energy and reflects a reflected portion of the received signal energy, and the reflected portion is thereafter redirected to a second amplifier 22 in a second receiver.

Figure 3:
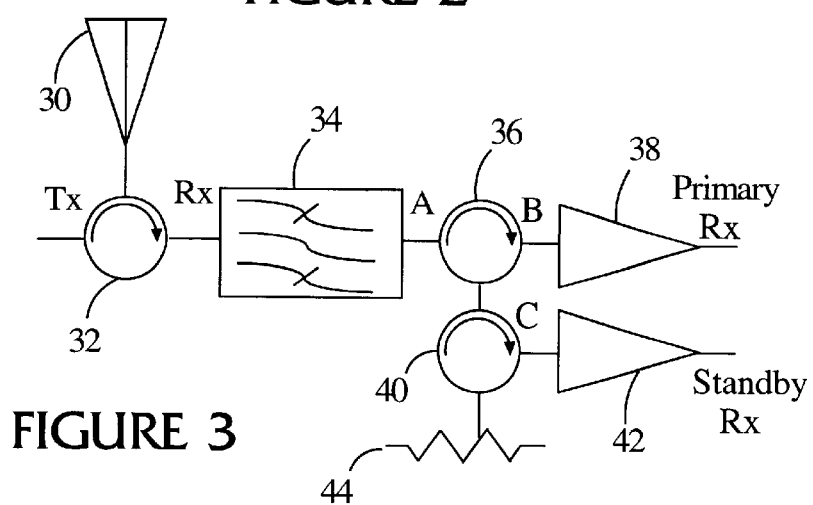
FIG. 3 is a block diagram illustrating a preferred embodiment of the present invention.

By way of further explanation, and with reference to FIG. 3, in a preferred embodiment the received signal enters antenna 30 and passes through a circulator 32 and filter 34 which typically serves to keep the strong transmitter signal (s) out of the receivers. The received signal is provided from filter 34 to the invention, a first three port directional circulator 36 which routes the entire signal to first low noise amplifier 38 in the primary receiver. Circulator 36 directs signals which are input to port A to be output at port B, and directs signals which are input to port B to be output at port C. Circulator 36 may be low loss microwave circulator which has less than 0.2 dB loss (preferably no loss) in the X-band. As is apparent, the losses in the signal delivered to amplifier 38 are limited to those small losses in circulator 36, in contrast to the power splitter and attendant losses of the prior art.

Low noise amplifier 38 amplifies a primary portion of the received signal and is intentionally optimized for low noise (thereby aggravating the impedance mismatch) to cause a usable signal to be reflected back to port B of circulator 36. Circulator 36 directs the reflected signal out of its port C to a second three-port directional circulator 40 (whose operation is the same as circulator 36) which routes the reflected signal to second low noise amplifier 42 in the standby receiver. Low noise receiver 42 may also reflect a portion of the signal directed to it, and the reflected portion is routed back to circulator 40 which directs it to a terminator 44 where the signal is absorbed or otherwise terminated.

Figure 4:
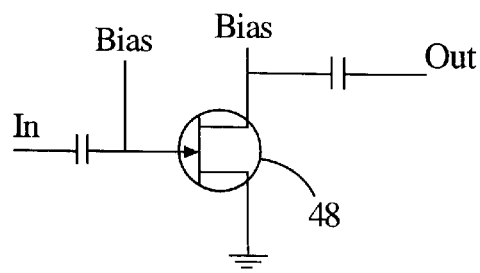
FIG. 4 is partial circuit diagram of a low noise amplifier which finds application in the receivers of the present invention.

Low noise amplifier 38 may be a single ended amplifier such as illustrated in FIG. 4. The preferred design includes but a single transistor 48 optimized for low noise. Such a transistor desirably exhibits a return loss of less than 6 dB (noise figure of 1.5 dB in the X-band).

The losses afforded by the present invention are apparent from the following example of a 10.7–11.7 GHz receiver with circulator losses of 0.2 dB. As is apparent, the losses at the primary receiver in the present invention are significantly less than in the prior art, and the losses at the standby receiver are also reduced.

TABLE 1

| | Present Invention | |
|---|---|---|
| Return Loss of Low Noise Amp | Primary Loss | Standby Loss |
| 2.0 dB | 0.2 dB | 2.4 dB |
| 3.0 | 0.2 | 3.4 |
| 4.0 | 0.2 | 4.4 |
| 5.0 | 0.2 | 5.4 |
| 6.0 | 0.2 | 6.4 |

TABLE 2

| | Prior Art | |
|---|---|---|
| Power Split to Primary | Primary Loss | Standby Loss |
| 50% | 3.0 dB | 3.0 dB |
| 60 | 2.2 | 4.0 |
| 70 | 1.5 | 5.2 |
| 80 | 1.0 | 7.0 |
| 90 | 0.5 | 10.0 |

The present invention is not limited to two receivers, as any appropriate number of receivers and associated circulators may be cascaded in the manner suggested above.

The present invention affords the further advantage of splitting received signal energy between a primary and a standby receiver so that when the primary receiver is removed or otherwise inoperable creating a mismatch, signal energy to the standby receiver is increased. With reference again to FIG. 3, received signal energy is provided to circulator 36 which is coupled to the primary receiver which, if operable, amplifies a portion of the received signal energy and reflects a reflected portion of the received signal energy. The reflected portion is directed back to circulator 36 and provide to circulator 40 which is coupled to standby receiver. When the primary receiver is decoupled from Circulator 38 the signal energy exiting port B of circulator 36 is reflected back in its entirety to circulator 36 (less any losses encountered) and is directed to circulator 40 and to the standby receiver. Thus, the signal to the standby receiver is almost the entire signal which would have been received by the primary receiver. In contrast, the prior art would continue to direct only the split portion of the signal to the standby receiver if the primary receiver became inoperable.

Figure 5:
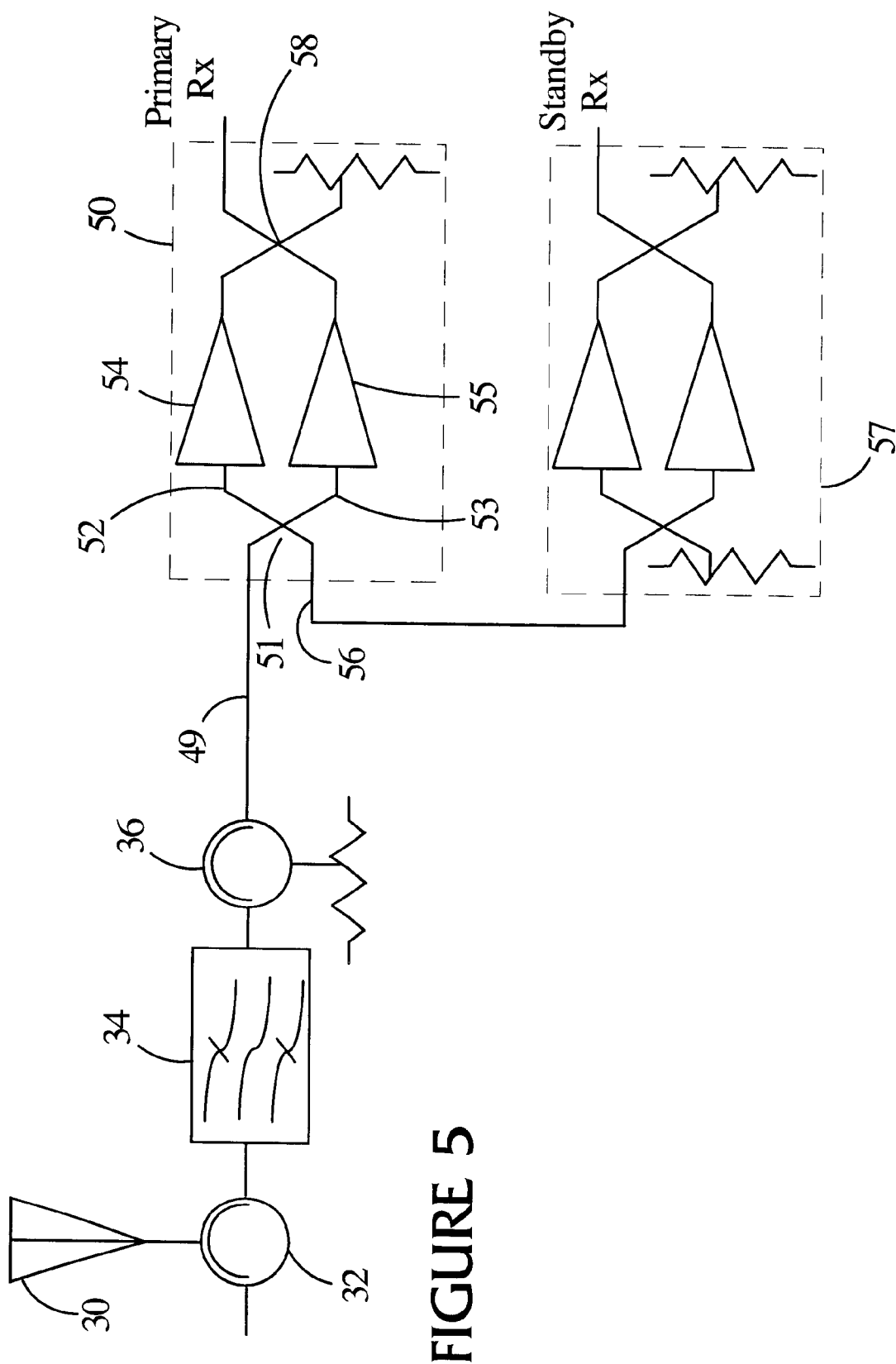
FIG. 5 is a simplified block diagram of another embodiment of the present invention.

By way of further explanation, and with reference to FIG. 3 (the preferred embodiment) and FIG. 5 (the directional coupler/balanced amplifier approach), the received signal enters antenna 30 and passes through a circulator 32 and filter 34 which typically serves to keep the strong transmitter signal(s) out of the receivers. The received signal is provided from filter 34 to an optional isolator 36 which routes the entire signal to first balanced low noise amplifier 50 in the primary receiver.

The received signal is then input to a first directional coupler 51 in the first balanced low noise amplifier 50. The directional coupler has the property of splitting the input signal at 49 between ports 52 and 53. The signal is then directed from the directional coupler to two Low noise amplifiers 54 and 55 which amplify a primary portion of the received signal, which is combined in a subsequent directional coupler 58 for the primary receiver. The amplifiers 54 and 55 are intentionally optimized for low noise (thereby aggravating the impedance mismatch) to cause a usable signal to be reflected back to each port (53 & 53) of the directional coupler.

The directional coupler having a directional property combines the reflected signals at the reflection port 56. The combined reflected portions at the reflected port 56 are then. connected to a subsequent low noise amplifier 57 in the secondary receiver.

While preferred embodiments of the present invention have been described, it is to be understood that the embodiments described are illustrative only and the scope of the invention is to be defined solely by the appended claims when accorded a full Range of equivalence, many variations and modifications naturally occurring to those of skill in the art from a perusal hereof.

What is claimed is:

1. A method of splitting received signal energy among plural receivers, the method comprising the steps of:

receiving signal energy at an antenna;

providing the received signal energy to a first receiver through a directional coupler which is coupled to a balanced pair of active devices in the first receiver having low input return loss wherein the active devices absorb or transmit the primary portion of the signal energy and reflect the secondary portion;

receiving the reflected secondary portion at the reverse coupler port; and providing the reflected secondary portion to a second receiver.

2. The method of claim 1 wherein the step of providing the reflected portion to a second receiver is repeated for a multitude of receivers.

3. A device for splitting received signal energy among plural receivers, the device comprising:

an antenna for receiving signal energy;

a first receiver including a balanced pair of low noise amplifiers for receiving and amplifying signal energy and for reflecting signal energy as a function of impedance mismatching;

a first directional coupler coupled to said first receiver for directing the received signal energy to said first receiver and for directing at the reverse coupler port a portion of the received signal energy reflected by said first receiver to subsequent receivers for use, a second receiver having low input return loss and including a balanced pair of low noise amplifiers and, a second directional coupler, coupled to said first directional coupler and to said balanced pair of low noise amplifiers, for directing the reflected portion from said first coupler to said second receiver.

4. The system of claim 3 wherein each of said low noise receivers includes a single ended amplifier having a single transistor exhibiting a return loss of less than about 6 dB.

5. The system of claim 3 wherein each of said low noise receivers includes a single ended amplifier having a single transistor having a noise figure of less than about 1.5 dB in the X-band.

* * * * *